US012774035B2

(12) United States Patent
Choi et al.

(10) Patent No.: US 12,774,035 B2
(45) Date of Patent: Oct. 27, 2026

(54) ROOF BODY STRUCTURE FOR VEHICLE

(71) Applicants: Hyundai Motor Company, Seoul (KR); Kia Corporation, Seoul (KR)

(72) Inventors: Sun Ki Choi, Hwaseong-si (KR); Yujeong Kim, Yongin-si (KR); Ji Won Chang, Seoul (KR); Inbum Lee, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 538 days.

(21) Appl. No.: 18/476,654

(22) Filed: Sep. 28, 2023

(65) Prior Publication Data

US 2024/0208581 A1 Jun. 27, 2024

(30) Foreign Application Priority Data

Dec. 22, 2022 (KR) ........................ 10-2022-0181650

(51) Int. Cl.
*B60J 7/02* (2006.01)
*B62D 25/06* (2006.01)

(52) U.S. Cl.
CPC ................ *B62D 25/06* (2013.01); *B60J 7/02* (2013.01)

(58) Field of Classification Search
CPC ... B62D 25/06; B60J 7/003; B60J 7/02; B60J 7/00; B60J 7/11
USPC ........ 296/210, 216.01, 203.01, 216.09, 37.7, 296/37.8, 218
See application file for complete search history.

(56) References Cited

U.S. PATENT DOCUMENTS 3,635,519 A * 1/1972 Foster .................... B62D 25/06 296/210
4,767,154 A * 8/1988 Okamoto ................. B60J 7/106 296/210
4,957,326 A * 9/1990 Chiba .................... B62D 25/06 296/210
5,018,781 A * 5/1991 Kumasaka ............. B62D 25/06 296/210
6,749,244 B1 * 6/2004 Song ....................... B60R 7/084 296/37.7
6,983,983 B2 * 1/2006 Lee ........................ B62D 25/06 296/201
8,678,484 B2 * 3/2014 Shono .................... B62D 25/04 296/203.03
8,770,644 B2 * 7/2014 Harders .................. B60R 11/00 296/214
8,944,494 B2 * 2/2015 Nakamura ............. B62D 25/04
9,079,618 B2 * 7/2015 Ishigame ................ B62D 25/04
10,160,501 B1 * 12/2018 Nania .................... B62D 25/06
(Continued)

FOREIGN PATENT DOCUMENTS

DE 102004005482 A1 * 8/2005 ............... B60R 7/04
DE 102018103707 A1 * 10/2018 ........... B62D 27/026
(Continued)

*Primary Examiner* — Carly W. Lynch
(74) *Attorney, Agent, or Firm* — Slater Matsil, LLP

(57) ABSTRACT

An embodiment roof body structure for a vehicle includes an outer roof panel coupled to a roof side disposed on each of two side parts of a vehicle body and defining a portion of an outside of the vehicle, an inner roof panel defining a portion of an inside of the vehicle, and a plurality of roof rails each disposed on a lower part of the inner roof panel and coupled to the roof side.

20 Claims, 5 Drawing Sheets

(56) References Cited

U.S. PATENT DOCUMENTS

| | | | | | |
|---|---|---|---|---|---|
| 10,696,330 | B2 * | 6/2020 | Chiba | B62D 25/06 | |
| 10,933,918 | B2 * | 3/2021 | Koreishi | B62D 25/06 | |
| 11,648,831 | B2 * | 5/2023 | Boyle | B60J 1/1853 | 296/218 |
| 11,685,445 | B2 * | 6/2023 | Okuyama | B62D 25/06 | |
| 11,745,801 | B2 * | 9/2023 | Nagahama | B62D 25/02 | |
| 12,358,564 | B2 * | 7/2025 | Kurokawa | B62D 25/06 | |
| 12,441,408 | B2 * | 10/2025 | Weyrauch | B62D 25/06 | |
| 2008/0100548 | A1 * | 5/2008 | Choi | B60R 11/0235 | 345/87 |
| 2010/0038933 | A1 * | 2/2010 | Comfort | B60J 7/022 | 296/216.08 |
| 2013/0119647 | A1 * | 5/2013 | Tanaka | B62D 25/04 | 280/730.1 |
| 2014/0028057 | A1 * | 1/2014 | Nishimura | B62D 25/04 | 296/210 |
| 2016/0332674 | A1 * | 11/2016 | Okuyama | B62D 29/00 | |
| 2018/0244314 | A1 * | 8/2018 | Cho | B62D 29/043 | |
| 2018/0319502 | A1 * | 11/2018 | Maclay | B64D 11/00 | |
| 2019/0168814 | A1 * | 6/2019 | Kim | B62D 29/008 | |
| 2019/0225278 | A1 * | 7/2019 | Chiba | B60J 7/043 | |
| 2019/0329638 | A1 * | 10/2019 | Willard | B60J 7/192 | |

FOREIGN PATENT DOCUMENTS

| | | | | | |
|---|---|---|---|---|---|
| JP | S59140122 | A | * | 8/1984 | B60J 7/11 |
| JP | 2013006519 | A | * | 1/2013 | B60D 25/06 |
| JP | 2016088461 | A | * | 5/2016 | B62D 25/06 |
| JP | 2019137156 | A | * | 8/2019 | B62D 25/06 |

* cited by examiner

ROOF BODY STRUCTURE FOR VEHICLE

CROSS-REFERENCE TO RELATED APPLICATIONS

This application claims the benefit of Korean Patent Application No. 10-2022-0181650, filed on Dec. 22, 2022, which application is hereby incorporated herein by reference.

TECHNICAL FIELD

The present disclosure relates to a roof body structure for a vehicle.

BACKGROUND

In general, a vehicle body may include a plurality of body members and a plurality of body panels. The vehicle body may be designed to satisfy a requirement (e.g., stiffness, strength, or durability) of each part.

In the vehicle, a roof body structure may include an inner roof part of the vehicle body, and a user experience (UX) product such as a monitor may be mounted on a roof body structure in a vehicle as a solution to increase marketability of the vehicle in an automobile industry.

A passenger may be provided with various conveniences in the case where the UX product is mounted on the roof body structure in the vehicle body. However, it may be disadvantageous in terms of a manufacturing cost, and it may be difficult to secure a ceiling strength of the roof body structure and a skeletal strength of the vehicle body.

In particular, for a vehicle using a detachable roof panel, there is a need to develop a structure in which the roof may be detached based on a user requirement.

SUMMARY

The present disclosure relates to a roof body structure for a vehicle. Particular embodiments relate to a roof body structure for a vehicle for mounting a user experience (UX) product in the vehicle by using a roof rail and a moving rail.

Embodiments of the present disclosure provide a roof body structure for a vehicle capable of mounting a user experience (UX) product on an inner roof part of the vehicle by using a roof rail and a moving rail in the vehicle using a detachable roof panel.

According to an embodiment, a roof body structure for a vehicle, which forms a roof part of a vehicle body, includes an outer roof panel coupled to a roof side disposed on each of two side parts of the vehicle body and forming the outside of the vehicle, an inner roof panel forming the inside of the vehicle, and a plurality of roof rails each disposed on a lower part of the inner roof panel and coupled to the roof side.

The outer roof panel and the inner roof panel may include a front roof panel disposed at a front side of the vehicle body and detachable from the roof side and a center roof panel disposed to be adjacent to the front roof panel toward the rear of the vehicle body and detachable from the roof side.

The structure may further include a rear roof panel disposed to be adjacent to the center roof panel toward the rear of the vehicle body and fixedly coupled to the roof side.

The plurality of roof rails may include a first roof rail and a second roof rail respectively installed at the front end and rear end of the front roof panel, and a third roof rail, a fourth roof rail, and a fifth roof rail respectively installed at the front end, center, and rear end of the center roof panel.

A side end of the second roof rail may be bent downward of the vehicle body and welding-coupled to an inner surface of an inner side panel.

The inner roof panel may have a panel convex part convex to the inside of the vehicle.

A side end of the outer roof panel may be hemming-coupled with a side end of the inner roof panel.

The inner roof panel and the roof rail may be coupled with each other by a bolt and a nut while having a gap at the panel convex part.

An end of the outer roof panel and an end of the inner roof panel, adjacent to the second roof rail of the front roof panel, and an end of the outer roof panel and an end of the inner roof panel, adjacent to the third roof rail of the center roof panel, may be hemming-coupled with each other, respectively.

A front end of the second roof rail and an end of the inner roof panel of the front roof panel and a rear end of the third roof rail and an end of the inner roof panel of the center roof panel may be coupled with each other by a weather strip, respectively.

The structure may further include a moving rail capable of mounting a user experience (UX) product thereon by being moved in a direction perpendicular to a length direction of the vehicle body.

The moving rail may be disposed between the second roof rail, the third roof rail, and the fourth roof rail.

A sixth roof rail providing a path along which the moving rail is moved may be coupled between the second roof rail and the third roof rail, and a bearing coupled to an upper end of the moving rail may be inserted into the sixth roof rail to be moved along the sixth roof rail.

A side end of the sixth roof rail may be welding-coupled together with an inner side panel, an outer side panel, and a side reinforcement.

A lower part of the sixth roof rail may be bent for the bearing to be inserted and seated therein.

According to an embodiment of the present disclosure, it is possible to reduce the equipment cost as well as the vehicle body weight by such a simple structure in which the UX product is mounted on the inner roof part of the vehicle that uses the roof rail and the moving rail.

It is also possible to provide the sense of openness to the passenger and the improved convenience of using the UX product by attaching or detaching the front and center roof panels.

It is also possible to improve the stiffness of the roof panel unit and strengthen the connection between the roof panel and the roof rail by allowing the roof panel to have the double structure and weld-connecting the roof side and the cross section of the roof rail with each other.

It is also possible to improve the lateral stiffness and noise, vibration, and harshness (NVH) performance of the vehicle body by the bolting-connection between the roof panel and the roof rail.

DETAILED DESCRIPTION OF ILLUSTRATIVE EMBODIMENTS

Figure 1:
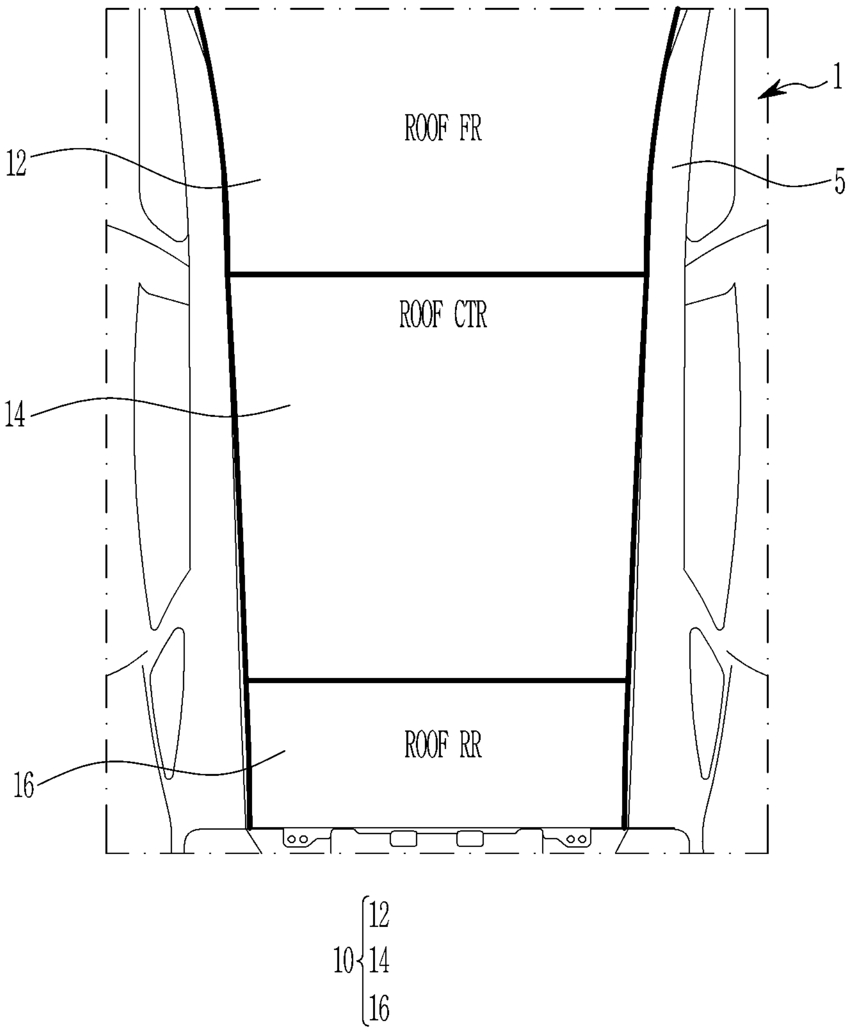
FIG. 1 is a view schematically showing a roof panel of a vehicle according to an embodiment of the present disclosure.

Hereinafter, embodiments of the present disclosure are described in detail with reference to the accompanying drawings for those skilled in the art to which the present disclosure pertains to easily practice embodiments of the present disclosure. However, the embodiments of the present disclosure may be modified in various different forms and are not limited to the embodiments provided in the specification.

In addition, in several embodiments, components having the same configuration are representatively described using the same reference numerals in an embodiment, and only components different from those of an embodiment are described in the other embodiments.

It should be understood that the drawings are schematic and not drawn to scale. The size and proportion of a component in the drawings are shown relatively exaggerated or reduced in size in order to clearly and easily explain the drawings. This arbitrary size is only illustrative and not limitative. In addition, the same reference numeral is used to denote a similar feature of the same structure, element, or part shown in two or more drawings. When it is described that an element is referred to as being “on” or “above” another element, it is to be understood that the element may be directly “on” another element or “above” another element including a third element interposed therebetween.

An embodiment of the present disclosure specifically represents one embodiment of the present disclosure. As a result, diagrams may be variously modified. Accordingly, an embodiment is not limited to a specific shape of the illustrated portion and may include, for example, a shape modified when produced.

Hereinafter, a roof body structure for a vehicle according to embodiments of the present disclosure is described in detail with reference to the accompanying drawings.

Figure 2:
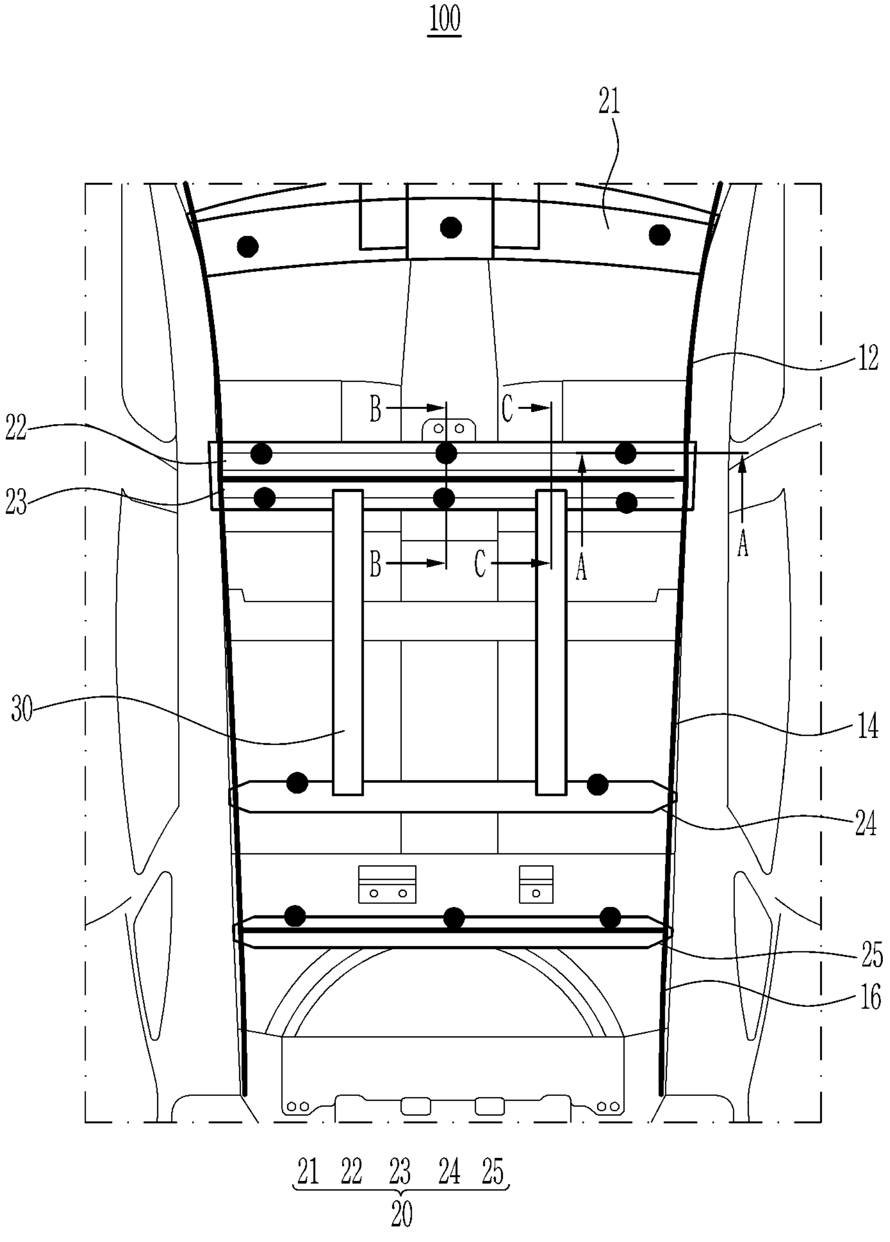
FIG. 2 is a view showing a roof body structure for a vehicle according to an embodiment of the present disclosure viewed from the inside of the vehicle.

FIG. 1 is a view schematically showing a roof panel of a vehicle according to an embodiment of the present disclosure; and FIG. 2 is a view showing a roof body structure for a vehicle according to an embodiment of the present disclosure viewed from the inside of the vehicle.

Referring to FIGS. 1 and 2, a roof body structure 100 for a vehicle according to an embodiment of the present disclosure may be formed in an inner roof part of a vehicle body 1 and mount a user experience (UX) product (not shown) thereon. The roof body structure 100 may include a roof panel 10 including an outer roof panel 11 and an inner roof panel 13 and a plurality of roof rails 20.

A roof side 5 may be disposed on each of two sides of the vehicle body 1, and each of two sides of the roof panel 10 may be coupled to the roof side 5 to form a ceiling-side roof part of the vehicle. The roof panel 10 may include a front roof panel 12, a center roof panel 14, and a rear roof panel 16. The front roof panel 12 may be disposed at a front side of the vehicle body 1, the center roof panel 14 may be disposed to be adjacent to the front roof panel 12 toward the rear of the vehicle body 1, and the rear roof panel 16 may be disposed to be adjacent to the center roof panel 14 toward the rear of the vehicle body 1 and fixedly coupled to the roof side 5. The front roof panel 12 and the center roof panel 14 may be detachable from the roof side 5.

The plurality of roof rails 20 may each be disposed on a lower part of the roof panel 10 in the vehicle body 1 and coupled to the roof side 5. The plurality of roof rails 20 may extend in a direction perpendicular to a length direction of the vehicle body 1 and be disposed at predetermined intervals from each other in the length direction of the vehicle body 1.

Each roof rail 20 may have a plurality of fixing points disposed at predetermined intervals. At this fixed point, the roof panel 10 and the roof rail 20 may be coupled with each other by a bolt 27 and a nut 28.

The plurality of roof rails 20 may include a first roof rail 21 and a second roof rail 22, respectively installed at the front end and rear end of the front roof panel 12, and a third roof rail 23, a fourth roof rail 24, and a fifth roof rail 25, respectively installed at the front end, center, and rear end of the center roof panel 14. The second roof rail 22 and the third roof rail 23 may be disposed to face each other at adjacent positions.

The roof body structure 100 may further include a moving rail 30. The moving rail 30 may be disposed between the plurality of roof rails 20 in the length direction of the vehicle body 1 and mount the UX product thereon by being moved in the direction perpendicular to the length direction of the vehicle body 1.

In an embodiment of the present disclosure, the moving rail 30 may have one end movable together with the second roof rail 22 and the third roof rail 23 and the other end movable together with the fourth roof rail 24. In addition, the pair of moving rails 30 may extend to be parallel to each other. One end and the other end of the moving rail 30 may be moved on the roof rail 20 by the same distance in the direction perpendicular to the length direction of the vehicle body 1, and the pair of moving rails 30 may be moved while being parallel to each other.

Figure 3:
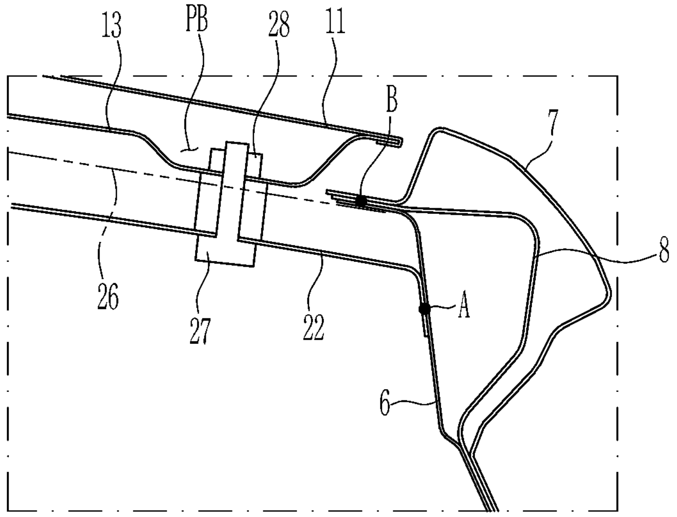
FIG. 3 is a cross-sectional view of the roof body structure cut along line A-A of FIG. 2.

FIG. 3 is a cross-sectional view of the roof body structure cut along line A-A of FIG. 2.

Referring to FIG. 3, the roof side 5 may include an inner side panel 6 disposed inside the vehicle body 1, an outer side panel 7 connected to the inner side panel 6 and disposed outside the vehicle body 1, and a side reinforcement 8 connected to the inner side panel 6 and the outer side panel 7 and disposed therebetween. Upper ends of the inner side panel 6, the outer side panel 7, and the side reinforcement 8 may be bent to extend to the center of the vehicle body 1 and may be welding-coupled together at a portion B.

A side end of the second roof rail 22 may be bent downward of the vehicle body 1 and welding-coupled to a portion A on an inner surface of the inner side panel 6.

A side end of a sixth roof rail 26 may be welding-coupled at the portion B together with the inner side panel 6, the outer side panel 7, and the side reinforcement 8. Here, the side end of the sixth roof rail 26 may be welded to a lower surface of the inner side panel 6.

Meanwhile, the roof panel 10 may include the outer roof panel 11 forming the outside of the vehicle and the inner roof panel 13 forming the inside of the vehicle. That is, the outer roof panel 11 and the inner roof panel 13 may be vertically coupled to each other in the roof part.

The inner roof panel 13 may have a panel convex part PB disposed on a side part of the vehicle and convex to the inside of the vehicle. At the panel convex part PB, the nut 28 may be welding-fixed to an upper surface of the inner roof panel 13, and the bolt 27 may pass through the inner roof panel 13 from the bottom to the top to be coupled with the nut 28. Here, the bolt 27 may pass through the roof rail 20 from the bottom to the top to be coupled to the nut 28 together with the inner roof panel 13. Therefore, the inner roof panel 13 and the roof rail 20 may have a predetermined gap at the panel convex part PB.

Meanwhile, a side end of the outer roof panel 11 may be hemming-coupled with a side end of the inner roof panel 13. Such hemming-coupling may indicate that the side end of the outer roof panel 11 is bent to surround the end of the inner roof panel 13 and then welded together.

Figure 4:
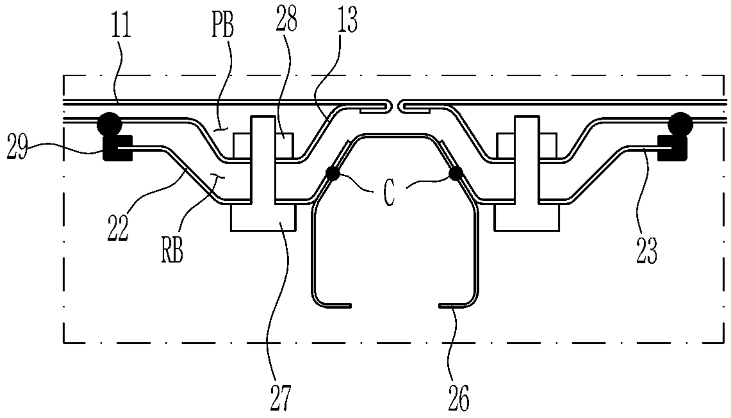
FIG. 4 is a cross-sectional view of the roof body structure cut along line B-B of FIG. 2.
Figure 5:
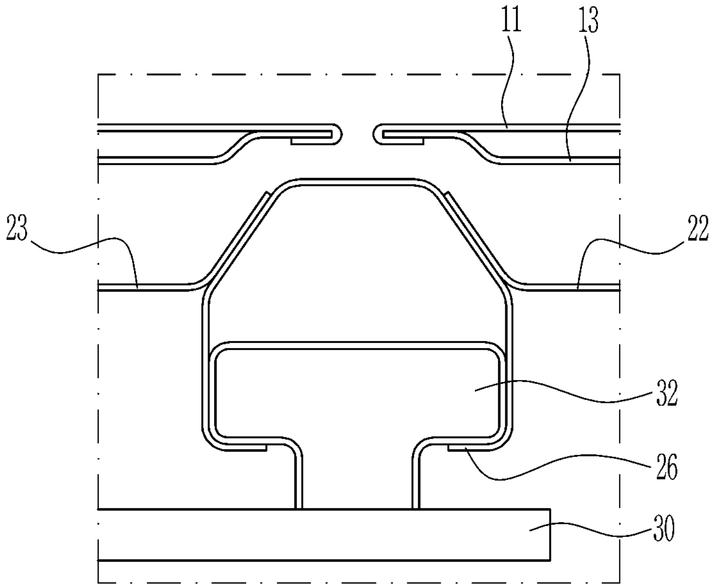
FIG. 5 is a cross-sectional view of the roof body structure cut along line C-C of FIG. 2.

FIG. 4 is a cross-sectional view of the roof body structure cut along line B-B of FIG. 2, and FIG. 5 is a cross-sectional view of the roof body structure cut along line C-C of FIG. 2.

Referring to FIG. 4, the second roof rail 22 and the third roof rail 23 are disposed to face each other at the adjacent positions, and an end of the outer roof panel 11 and an end of the inner roof panel 13, adjacent to the second roof rail 22 of the front roof panel 12, may be hemming-coupled with each other. In addition, an end of the outer roof panel 11 and an end of the inner roof panel 13, adjacent to the third roof rail 23 of the center roof panel 14, may be hemming-coupled with each other.

The second roof rail 22 and the third roof rail 23 may be coupled with each other in a region of a lower part of the inner roof panel 13, where the panel convex part PB is disposed, by using the bolt 27 and the nut 28 to have a shape corresponding to a shape of the panel convex part PB.

A front end of the second roof rail 22 and an end of the inner roof panel 13 of the front roof panel 12 may be coupled with each other by a weather strip 29. In addition, a rear end of the third roof rail 23 and an end of the inner roof panel 13 of the center roof panel 14 may be coupled with each other by the weather strip 29. The weather strip 29 may be made of a rubber material and serve to prevent penetration of moisture, foreign materials, or the like between the inner roof panel 13 and the roof rails 22 and 23.

Meanwhile, the sixth roof rail 26 may be coupled between the second roof rail 22 and the third roof rail 23 at a portion C. Here, the coupling may be made by welding. The sixth roof rail 26 may provide a path along which the moving rail 30 is moved, and a bearing 32 coupled to an upper end of the moving rail 30 may be inserted into the sixth roof rail 26.

As shown in FIG. 5, the sixth roof rail 26 may have an upper part bent to correspond to shapes of lower parts of the second roof rail 22 and the third roof rail 23 to be coupled between the second roof rail 22 and the third roof rail 23, and a lower part of the sixth roof rail 26 may be open and bent for the bearing 32 to be inserted and seated therein. The moving rail 30 may be coupled to the lower part of the bearing 32 and moved as the bearing 32 is moved along the sixth roof rail 26. The UX product may be mounted on a lower part of the moving rail 30, and a user may adjust a position of the UX product by moving the moving rail 30 in the direction perpendicular to the length direction of the vehicle body 1.

As set forth above, according to the embodiments of the present disclosure, it is possible to reduce the equipment cost as well as the vehicle body weight by such a simple structure in which the UX product is mounted on the inner roof part of the vehicle that uses the roof rail and the moving rail.

It is also possible to provide the sense of openness to the passenger, and the improved convenience of using the UX product by attaching or detaching the front and center roof panels.

It is also possible to improve the stiffness of the roof panel unit and strengthen the connection between the roof panel and the roof rail by allowing the roof panel to have the double structure and weld-connecting the roof side and the cross section of the roof rail with each other.

It is also possible to improve the lateral stiffness and noise, vibration, and harshness (NVH) performance of the vehicle body by the bolting-connection between the roof panel and the roof rail.

Although exemplary embodiments of the present disclosure have been described hereinabove, the scope of the embodiments of the present disclosure is not limited thereto, and all equivalent modifications easily modified by those skilled in the art to which the present disclosure pertains are intended to fall within the scope and spirit of the embodiments of the present disclosure.

The following reference identifiers may be used in connection with the drawings to describe various features of embodiments of the present disclosure.

| | |
|---|---|
| 100: roof body structure for vehicle | 1: vehicle body |
| 5: roof side | 6: inner side panel |
| 7: outer side panel | 8: side reinforcement |
| 10: roof panel | 11: outer roof panel |
| 12: front roof panel | 13: inner roof panel |
| 14: center roof panel | 16: rear roof panel |
| 20: roof rail | 21: first roof rail |
| 22: second roof rail | 23: third roof rail |
| 24: fourth roof rail | 25: fifth roof rail |
| 26: sixth roof rail | 27: bolt |
| 28: nut | 29: weather strip |
| 30: moving rail | 32: bearing |
| PB: panel convex part | |

What is claimed is:

1. A roof body structure for a vehicle, the structure comprising:

an outer roof panel coupled to a roof side disposed on each of two side parts of a vehicle body and defining a portion of an outside of the vehicle;

an inner roof panel defining a portion of an inside of the vehicle, wherein the outer roof panel and the inner roof panel combined comprise:

a front roof panel disposed at a front side of the vehicle body, the front roof panel being detachable from the roof side, and a center roof panel disposed adjacent to a rear end of the front roof panel in a length direction of the vehicle body, the center roof panel being detachable from the roof side;

a plurality of roof rails each disposed on a lower part of the inner roof panel and coupled to the roof side, wherein the plurality of roof rails comprise:

a first roof rail and a second roof rail respectively installed at a front end and the rear end of the front roof panel, and a third roof rail, a fourth roof rail, and a fifth roof rail respectively installed at a front end, a center region, and a rear end of the center roof panel; and a moving rail disposed between the second roof rail, the third roof rail, and the fourth roof rail, wherein the moving rail is configured to mount a user experience product on the moving rail and configured to be moved in a direction perpendicular to the length direction of the vehicle body.

2. The structure of claim 1, wherein the outer roof panel and the inner roof panel combined further comprise a rear roof panel disposed adjacent to a rear end of the center roof panel in the length direction of the vehicle body, the rear roof panel being fixedly coupled to the roof side.

3. The structure of claim 1, further comprising an inner side panel, wherein a side end of the second roof rail is bent downward in a height direction of the vehicle body and wherein the side end is welding-coupled to an inner surface of the inner side panel.

4. The structure of claim 1, wherein the inner roof panel comprises a panel convex part convex to the inside of the vehicle.

5. The structure of claim 4, wherein a side end of the outer roof panel is hemming-coupled with a side end of the inner roof panel.

6. The structure of claim 4, further comprising a bolt and a nut, wherein the inner roof panel and a respective roof rail of the plurality of roof rails are coupled with each other by the bolt and the nut while having a gap at the panel convex part.

7. The structure of claim 4, wherein:
- a first end of the outer roof panel and a first end of the inner roof panel, adjacent to the second roof rail, are hemming-coupled with each other; and
- a second end of the outer roof panel and a second end of the inner roof panel, adjacent to the third roof rail, are hemming-coupled with each other.

8. The structure of claim 4, further comprising a first weather strip and a second weather strip, wherein:
- a front end of the second roof rail and a first end of the front roof panel are coupled with each other by the first weather strip; and
- a rear end of the third roof rail and a first end of the center roof panel are coupled with each other by the second weather strip.

9. The structure of claim 1, further comprising:
- a sixth roof rail coupled between the second roof rail and the third roof rail, the sixth roof rail configured to provide a path along which the moving rail is movable; and
- a bearing coupled to an upper end of the moving rail and inserted into the sixth roof rail, such that the moving rail is configured to be moved along the sixth roof rail via the bearing.

10. The structure of claim 9, further comprising an inner side panel, an outer side panel, and a side reinforcement, wherein a side end of the sixth roof rail is welding-coupled together with the inner side panel, the outer side panel, and the side reinforcement.

11. The structure of claim 10, wherein a lower part of the sixth roof rail is bent for the bearing to be inserted and seated therein.

12. A vehicle comprising:
- a vehicle body;
- a roof side disposed on each of two side parts of the vehicle body;
- an outer roof panel coupled to the roof side and defining a portion of an outside of the vehicle;
- an inner roof panel defining a portion of an inside of the vehicle, wherein the outer roof panel and the inner roof panel combined comprise:
  - a front roof panel disposed at a front side of the vehicle body, the front roof panel being detachable from the roof side,
  - a center roof panel disposed adjacent to a rear end of the front roof panel in a length direction of the vehicle body, the center roof panel being detachable from the roof side, and
  - a rear roof panel disposed adjacent to a rear end of the center roof panel in the length direction of the vehicle body, the rear roof panel being fixedly coupled to the roof side;
- a plurality of roof rails each disposed on a lower part of the inner roof panel and coupled to the roof side, wherein the plurality of roof rails comprises:
  - a first roof rail and a second roof rail respectively installed at a front end and the rear end of the front roof panel, and
  - a third roof rail, a fourth roof rail, and a fifth roof rail respectively installed at a front end, a center region, and the rear end of the center roof panel; and
- a moving rail configured to mount a user experience product on the moving rail and configured to be moved in a direction perpendicular to the length direction of the vehicle body, wherein the moving rail is disposed between the second roof rail, the third roof rail, and the fourth roof rail.

13. The vehicle of claim 12, further comprising an inner side panel, wherein a side end of the second roof rail is bent downward in a height direction of the vehicle body and wherein the side end is welding-coupled to an inner surface of the inner side panel.

14. The vehicle of claim 12, wherein the inner roof panel comprises a panel convex part convex to the inside of the vehicle.

15. The vehicle of claim 14, further comprising a bolt and a nut, wherein:
- a side end of the outer roof panel is hemming-coupled with a side end of the inner roof panel; and
- the inner roof panel and a respective roof rail of the plurality of roof rails are coupled with each other by the bolt and the nut while having a gap at the panel convex part.

16. The vehicle of claim 14, wherein:
- a first end of the outer roof panel and a first end of the inner roof panel, adjacent to the second roof rail, are hemming-coupled with each other; and
- a second end of the outer roof panel and a second end of the inner roof panel, adjacent to the third roof rail, are hemming-coupled with each other.

17. A vehicle comprising:
- a vehicle body;
- a pair of roof sides extending along a length direction of the vehicle body respectively at both lateral sides of the vehicle body;
- a plurality of roof rails extending along a width direction of the vehicle body and fixed to the pair of roof sides, wherein the plurality of roof rails comprise a first roof rail, a second roof rail, a third roof rail, a fourth roof rail, and a fifth roof rail;
- a front roof panel comprising a front-roof-panel outer roof panel defining a first outside portion of an outside of the vehicle, and a front-roof-panel inner roof panel defining a first inside portion of an inside of the vehicle,
  - wherein the front-roof-panel outer roof panel is joined to the front-roof-panel inner roof panel,
  - wherein the front roof panel is detachably coupled to the first roof rail and the second roof rail, and
  - wherein the first roof rail and the second roof rail are respectively disposed at a front end and a rear end of the front roof panel;
- a center roof panel disposed adjacent to the rear end of the front roof panel in the length direction of the vehicle body, wherein the center roof panel comprises a center-roof-panel outer roof panel defining a second outside portion of the outside of the vehicle, and a center-roof-panel inner roof panel defining a second inside portion of the inside of the vehicle, wherein the center-roof-panel outer roof panel is joined to the center-roof-panel inner roof panel, wherein the center roof panel is detachably coupled to the pair of roof sides via at least one of the third roof rail, the fourth roof rail, or the fifth roof rail, and wherein the third roof rail, the fourth roof rail, and the fifth roof rail are respectively disposed at a front end, a center region, and a rear end of the center roof panel; and a moving rail disposed between the second roof rail, the third roof rail, and the fourth roof rail, wherein the moving rail is configured to mount a user experience product on the moving rail and configured to be moved in a direction perpendicular to the length direction of the vehicle body.

18. The vehicle of claim 17, further comprising a rear roof panel disposed adjacent to the rear end of the center roof panel in the length direction of the vehicle body, wherein the rear roof panel is fixedly coupled to the pair of roof sides.

19. The vehicle of claim 17, further comprising:

a sixth roof rail coupled between the second roof rail and the third roof rail, the sixth roof rail being configured to provide a path along which the moving rail is movable; and a bearing coupled to an upper end of the moving rail and inserted into the sixth roof rail, such that the moving rail is configured to be moved along the sixth roof rail via the bearing.

20. The vehicle of claim 17, further comprising:

a first weather strip disposed between the second roof rail and the front-roof-panel inner roof panel; and a second weather strip disposed between the third roof rail and the center-roof-panel inner roof panel.

* * * * *